United States Patent [19]

Müller

[11] Patent Number: 4,591,043
[45] Date of Patent: May 27, 1986

[54] MECHANISM FOR SPACING AND CONVEYING ARTICLES IN A PACKAGING MACHINE

[75] Inventor: Rolf Müller, Konz, Fed. Rep. of Germany

[73] Assignee: The Mead Corporation, Dayton, Ohio

[21] Appl. No.: 600,758

[22] Filed: Apr. 16, 1984

[30] Foreign Application Priority Data

Apr. 22, 1983 [GB] United Kingdom ............... 8311035

[51] Int. Cl.$^4$ .............................................. B65G 47/26
[52] U.S. Cl. ..................................... 198/425; 198/626
[58] Field of Search .............. 198/425, 604, 626, 620, 198/799, 726, 732, 487, 468.10, 740; 53/48, 543

[56] References Cited

U.S. PATENT DOCUMENTS 3,827,211  8/1974  Zavatone et al. ................... 198/425
4,076,115  2/1978  Daisley et al. ...................... 198/487
4,469,217  9/1984  Meyer et al. ....................... 198/425

FOREIGN PATENT DOCUMENTS 481595  11/1951  Italy ................................. 198/799

Primary Examiner—Joseph E. Valenza
Assistant Examiner—Kyle E. Shane
Attorney, Agent, or Firm—Erwin Doerr

[57] ABSTRACT

A spacer and conveyor mechanism for a packaging machine in which articles can be conveyed along a feed path and grouped together for subsequent packaging of each group into a discrete unit. The mechanism has a series of spacer and conveyor elements (94) constrained cyclically to execute a working and return motion such that the elements move along a working path in the feed direction of the articles during which the elements interfere with the articles in the feed path so as to form and convey said groups along the feed path and move along a return path opposite to the feed direction of the articles during which said elements are remote from said articles. The working and return paths are substantially parallel to the feed path, and the spacer and conveyor elements each have an operative face adapted to convey said articles in spaced relationship. The elements are mounted so that they are held throughout their cyclic movement with their operative faces facing towards the feed path.

5 Claims, 6 Drawing Figures

MECHANISM FOR SPACING AND CONVEYING ARTICLES IN A PACKAGING MACHINE

This invention relates to a spacer and conveying mechanism in or for a packaging machine which correctly spaces individual articles (preferably containers like bottles or cans of round, oval or square shape) which comprise a group for a multi-article package from one or more continuous article feed lines and holds the articles for movement together as a group in a predetermined position relative to one another.

Equipment which separates articles to form groups is known and in particular separating-chains on which article engaging pins are mounted are well known in order to momentarily retard or arrest the infeed movement of an article into a packaging machine. Whilst the known arrangements hold the articles they do not establish and maintain them exactly in an optimum position ready for packaging.

The present invention provides in or for a packaging machine in which articles can be conveyed along a feed path and grouped together for subsequent packaging of each group into a discrete unit, spacer and conveyor mechanism having a series of spacer and conveyor elements constrained cyclically to execute a working and return motion such that said elements move along a working path in the feed direction of the articles during which said elements engage with said articles in the feed path so as to form and convey said groups along the feed path and move along a return path opposite to the feed direction of the articles during which said elements are remote from said articles, said working and return paths being substantially parallel to said feed path, and characterized in that said spacer and conveyor elements each have an operative face adapted to convey said articles in spaced relationship, said elements being mounted so that the elements are held throughout their cyclic movement with their operative faces facing towards said feed path.

Embodiments of the invention will now be described by way of example, with reference to the accompanying drawings, in which.

Figure 1:
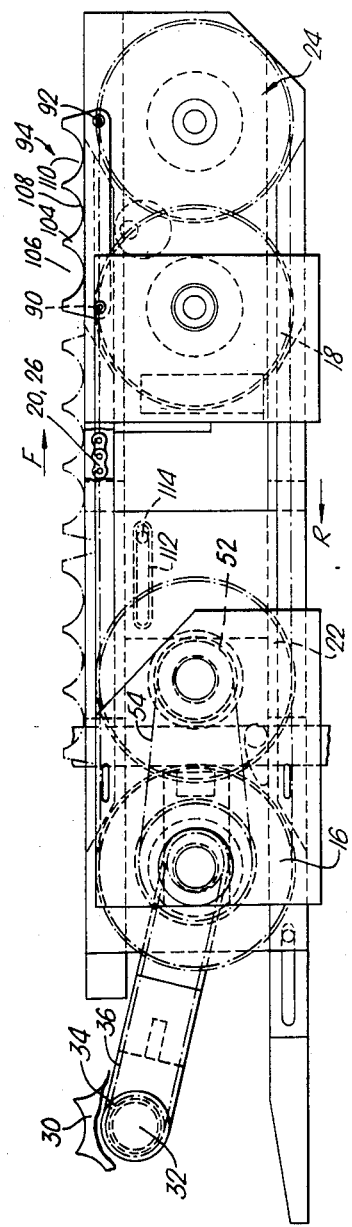
FIG. 1 is a plan view of a mechanism according to the invention.
Figure 2:
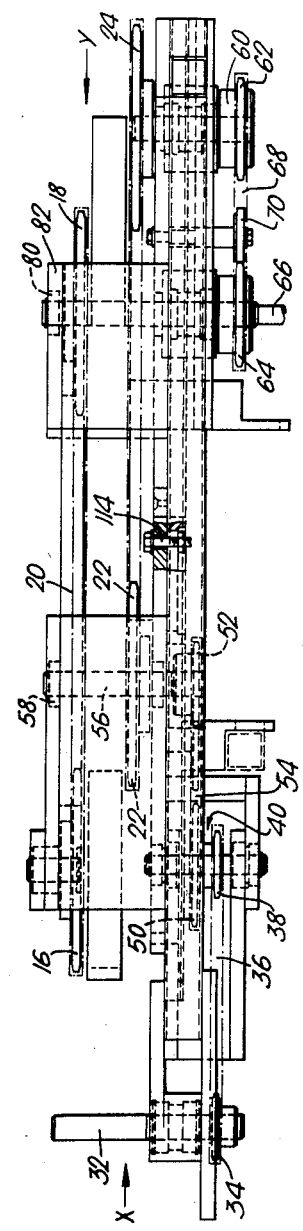
FIG. 2 is a side view of the mechanism shown in FIG. 1.
Figure 3:
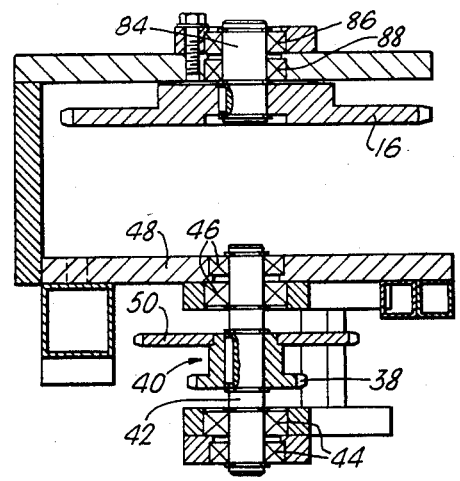
FIG. 3 is an end view from end "X" of FIG. 2.

Referring to the drawings, the spacing and conveying mechanism 10 comprises two pairs of chain and sprocket sets; an upper set 12 and a lower set 14. The upper chain and sprocket set 12 comprises spaced sprockets 16 and 18, respectively, about which is entrained chain 20. Similarly the lower chain and sprocket set 14 comprises spaced sprockets 22 and 24, respectively, about which is entrainted chain 26.

Figure 5:
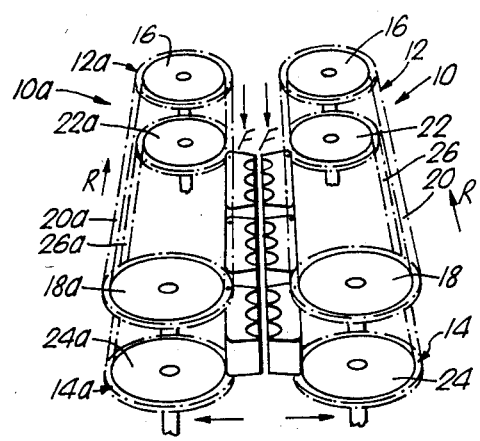
FIG. 5 is a schematic view of two similar mechanisms according to the invention mounted side-by-side as viewed from the outfeed end thereof; and, FIG. 6 is a plan view similar to FIG. 1 but in which two similar mechanisms are disposed in side by side relationship.
Figure 6:
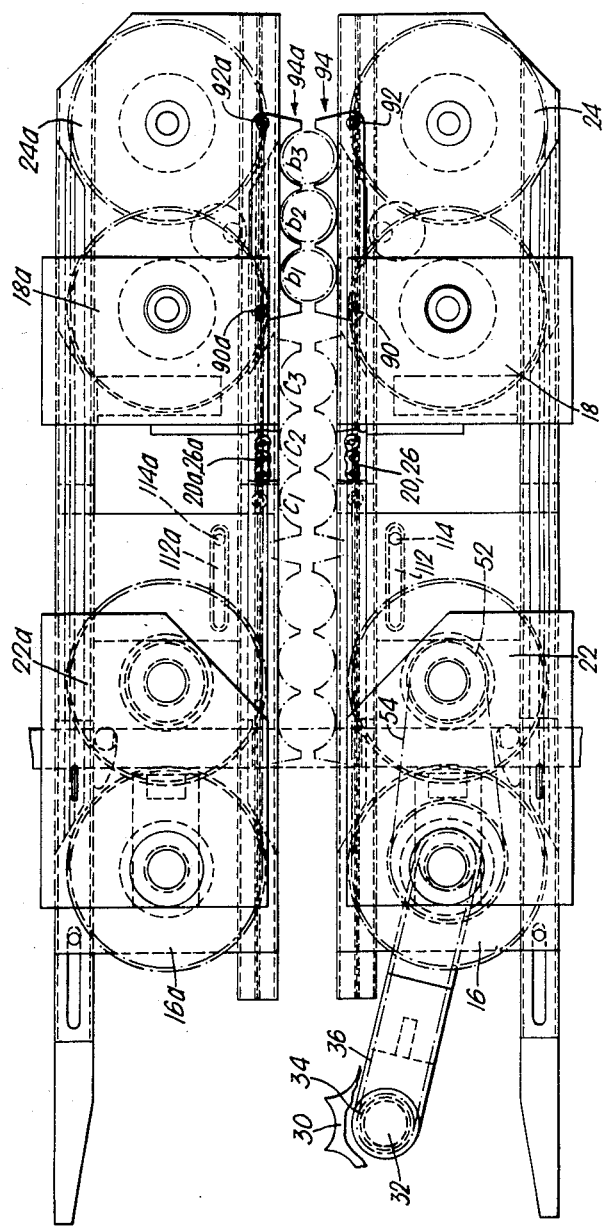

The spacing and conveying mechanism 10 is adapted to be installed in a packaging machine so that sprockets 16 and 24 are located adjacent the infeed end of the machine. Normally, two such mechanisms are installed in side-by-side relationship as shown in FIGS. 5 and 6 so that a bottle (or other article) feed path is provided between the mechanisms. In FIGS. 5 and 6 the mechanism 10a is similar to mechanism 10 to be described in more detail below and like parts are designated by like reference numerals with the addition of suffix "a".

At the infeed end of the mechanism 10, there is provided a "star-wheel" drive assembly comprising a bottle separating star-wheel 30 for separating bottles arriving at the infeed position from a bottling line. The star-wheel 30 is carried by vertical shaft 32 which is adapted to be driven from the main drive source (not shown) of the packaging machine. An alternative (and preferred) main drive connection is referred to hereinafter. Shaft 32 also carries a sprocket 34 which transmits drive via chain 36 to sprocket 38 of sprocket assembly 40 keyed to vertical shaft 42. The lower end of vertical shaft 42 is journalled in bearings 44 and the upper end of the shaft 42 is journalled in bearings 46 mounted in a lower part of frame 48. A drive take off sprocket 50 included in assembly 40 transmits drive to sprocket 52 via chain 54. Sprocket 52 is carried by the lower end of vertical shaft 56, the upper end of which is journalled in bearing 58 mounted in an upper part of frame 48.

Sprocket 24 is carried at the upper end of vertical shaft 60, the lower end of which carries sprocket 62. Sprocket 62 drives sprocket 64 carried at the lower end of vertical shaft 66 via chain 68 and tensioning roller 70. Sprocket 64 is fixed to assembly 72 which is keyed to the shaft 66 immediately below bearing assembly 74 incorporating bearings 76, 78, respectively, in which the shaft is journalled. The upper end of shaft 66 is journalled in bearing 80 housed in the upper part of frame 82 and sprocket 18 of chain and sprocket set 12 is keyed to shaft 66 immediately below journal bearing 80. As previously mentioned, drive from upper sprocket 18 to upper sprocket 16 is transmitted by means of chain 20. Sprocket 16 is keyed to stub shaft 84 journalled in an upper part of frame 48 in bearings 86 and 88 respectively.

It will be seen that the main sprockets 16, 18 of the upper chain and sprocket set 12 have their shaft axes displaced longitudinally of the mechanism with respect to the shaft axes of the main sprockets 22, 24 of the lower chain and sprocket set 14. The longitudinal spacing between the upper and lower sprockets of each end of the mechanism is equal to the distance between the attachment apertures 90, 92 of a bottle spacer and conveyor element 94 mounted in the space between the chain and sprocket sets 12, 14.

A series of such spacer conveyor elements is mounted between the chain and sprocket sets and each element 94 has one of its ends attached to chain 20 and its opposite end attached to chain 26.

Figure 4:
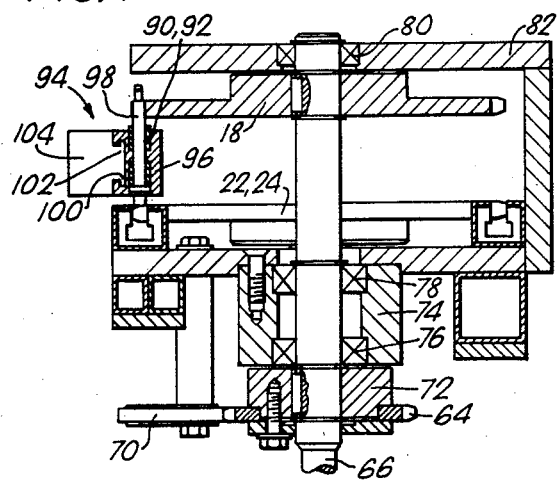
FIG. 4 is an end view from end "Y" of FIG. 2.

It will be appreciated from the foregoing that the chains 20 and 26 are driven in synchronism and thus each spacer and conveyor element 94 is thereby moved along the chain paths. As best seen in FIG. 4, each spacer conveyor element 94 comprises a support housing 96 in which the attachment apertures 90, 92 are formed. A connecting pin 98 passes through each attachment aperture and one end of each pin 98 is connected to respective ones of the chains 20 and 26. The support housing is formed with an outwardly facing keyway 100 into which a key 102 integral with the back face of a spacer and conveyor "comb" 104 is inserted in a sliding fit. The front or outward projecting face of the comb 104 comprises a series (in this case three) bottle group-forming arcuate recesses 106, 108, 110 each to receive a peripheral wall portion of a bottle when the mechanism is in use. In operation, the spacer and conveyor elements 94 are moved by the chains 20, 26 along a return path (arrow "R") and transversely between sprockets 16 and 22 so as to progressively transfer into a bottle feed path (arrow "F"), i.e. a working path during which transfer the elements 94 interfere with a linear series of bottles in the feed path so that the bottles are separated by the comb 104 whereby one bottle is received in each of the arcuate recesses 106-110.

As the spacer and conveyor elements move through the bottle feed path, the bottles conveyed thereby are maintained in correctly spaced relationship and at a preselected speed so that each group of bottles thus conveyed by one of said elements can be packaged together as a unit. When each spacer and conveyor element 94 reaches the outfeed end of the bottle feed path, as shown in FIG. 1, the element is moved transversely into the return path. It will be understood that the connection of the element at each of its ends to the spaced chains 20, 26, necessarily causes the transverse movement to occur such that the longitudinal axis of the element remains parallel to the bottle feed and return paths and such that the outward projecting face of the comb 104 always faces toward the bottle feed path.

Where only one such mechanism is installed in a packaging machine it would be necessary to provide an abutment surface adjacent the path of movement of the elements 94 in the bottle feed path. However, the arrangement shown in FIGS. 5 and 6 is to be preferred, that is to say where two such mechanisms are installed in side by side relationship. It will be seen that in this arrangement the series of spacer and conveyor elements are mutually located so that they come together in timed relationship to move along the bottle feed path so as to form cavities, e.g. cavities C1, C2, C3 in which bottles b1, b2, b3 are accommodated.

Whilst the above description relates to "combs" having arcuate recesses for bottles, it is to be understood that combs having other shaped recesses may be provided depending upon the article to be packaged. To this end, the comb 104 is removed from the housing 96 and a replacement comb slid into position. Combs may also be inserted having recesses of different diameter as desired.

Moreover, it is envisaged that the pitch between respective chain sets may be altered which also would necessitate a corresponding change in the size of the spacer and conveyor elements, for the purpose of pitch change, that part of the support frame to which sprockets 22 and 24 are mounted may be adjustably moved relative to the support frame for the upper sprockets 16 and 18 by means of slot 112 and bolt 114 adjustor provided in the lower support frame.

It is preferred that drive from the main drive source of a packaging machine in which the mechanism is installed be connected to sprockets 64 and 66 so that each chain set is driven independently, rather than the drive connection to the infeed end of the mechanism previously referred to. However, the relative drive connections otherwise remain as described. Drive to the mating mechanism 10a may be similarly arranged.

I claim:

1. In a packaging machine in which articles are conveyed along a feed path and formed into groups for subsequent packaging, a spacer and conveying mechanism comprising a set of endless chains and a series of spacer and conveyor elements mounted thereon, each of said elements having an operative face effective to convey said articles in spaced relationship and being arranged to move along a working path in the feed direction of the articles during which said elements engage said articles in the feed path so as to form groups of articles and convey said groups along the feed path and, after releasing said groups, move along a parallel return path opposite to the feed direction, characterized in that said set of endless chains comprises an upper chain and a lower chain mounted for synchronous movement on sprockets disposed in spaced horizontal planes, said upper and lower chains being vertically aligned with each other but longitudinally offset in the direction of the feed path, and in that each of said spacer and conveyor elements has the leading end thereof attached to one of said chains and the trailing end thereof attached to the other of said chains by means of pivotal connections, said upper chain being offset relative to said lower chain by an amount which is substantially equal to the distance between said connections between said leading and trailing ends of said elements and the respective chains, whereby said spacer elements are moved from the return path into the working path, and vice versa, transversely of the feed direction and held throughout its movement so that the operative faces thereof face toward said feed path.

2. Mechanism according to claim 1, further characterized in that the operative face of each of said spacer and conveyor elements comprises a series of spaced recesses.

3. Mechanism according to claim 2, further characterized in that said recesses are arcuate.

4. Mechanism according to claim 2, further characterized in that said spacer and conveyor elements comprise removable blocks mounted in a support housing which is connected to said endless chains.

5. Arrangement according to claim 1, further including a second set of endless chains with spacer and conveyor elements mounted thereon, said second set being disposed in side by side relationship to said spacer and conveyor mechanism so that said feed path is provided between the working paths of said mechanisms and said second set, the spacer and conveyor elements of said second set being arranged to cooperate with the spacer and conveyor elements of said mechanism along said working path so as to form article receiving cavities therebetween in which articles are conveyed along said working path.

* * * * *